Nov. 1, 1932.  H. C. BOWEN ET AL  1,885,174

BRAKE MECHANISM

Filed Feb. 14, 1930  2 Sheets-Sheet 1

Inventors:
Herbert C. Bowen
Joseph R. Heidloff
By Williams, Bradbury, McCaleb & Hinkle
Attys.

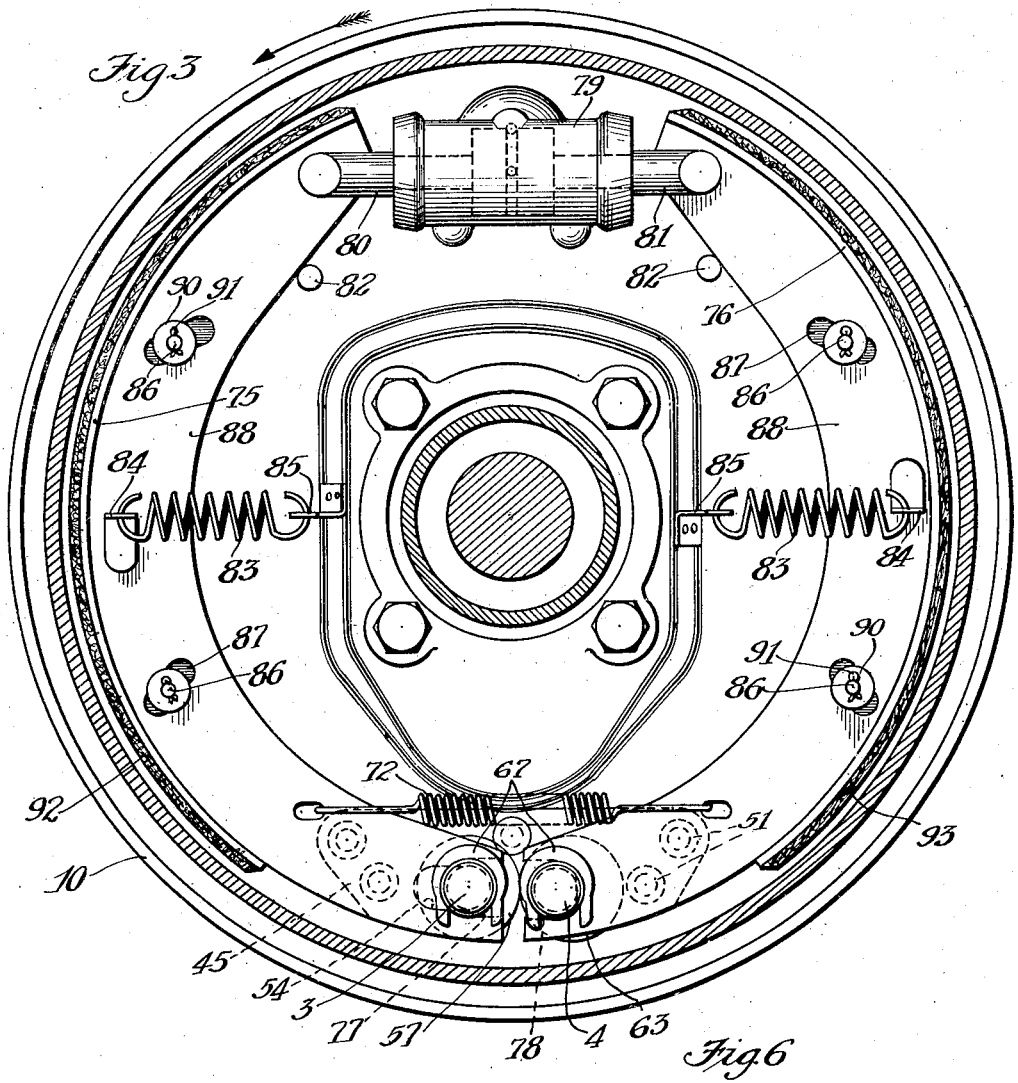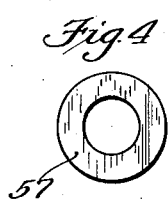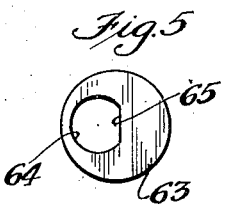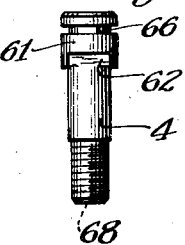

Patented Nov. 1, 1932

1,885,174

UNITED STATES PATENT OFFICE

HERBERT C. BOWEN AND JOSEPH R. HEIDLOFF, OF DETROIT, MICHIGAN, ASSIGNORS TO HYDRAULIC BRAKE COMPANY, OF LOS ANGELES, CALIFORNIA, A CORPORATION OF CALIFORNIA

BRAKE MECHANISM

Application filed February 14, 1930. Serial No. 428,293.

This invention relates to a brake mechanism and more particularly to such a device including a device for adjusting the distance between two adjacent portions of the friction means for compensating for wear of the brake lining.

An object of our invention is the provision of a brake mechanism including friction means having ends disposed adjacent each other and including improved means whereby said ends may be relatively adjusted to compensate for wear of the brake lining and in which the adjusting may be quickly and accurately accomplished without removing the brake drum from its normal position.

Another object is the provision of an inexpensive adjusting mechanism which will not shift from adjusted position when subjected to continued and severe vibrations.

In the accompanying drawings illustrating one embodiment of our invention,

Figure 3 is a vertical section similar to Figure 1 and showing a modified form of brake mechanism incorporating my invention, the direction of rotation of the drum in the forward movement of the vehicle being indicated by the arrow;

Figure 4 is a plan view of a concentric disk hereinafter described;

Figure 5 is a plan view of an eccentric disk hereinafter described;

Figure 6 is an elevation of a bolt or pivot pin used in my invention.

Figure 1:
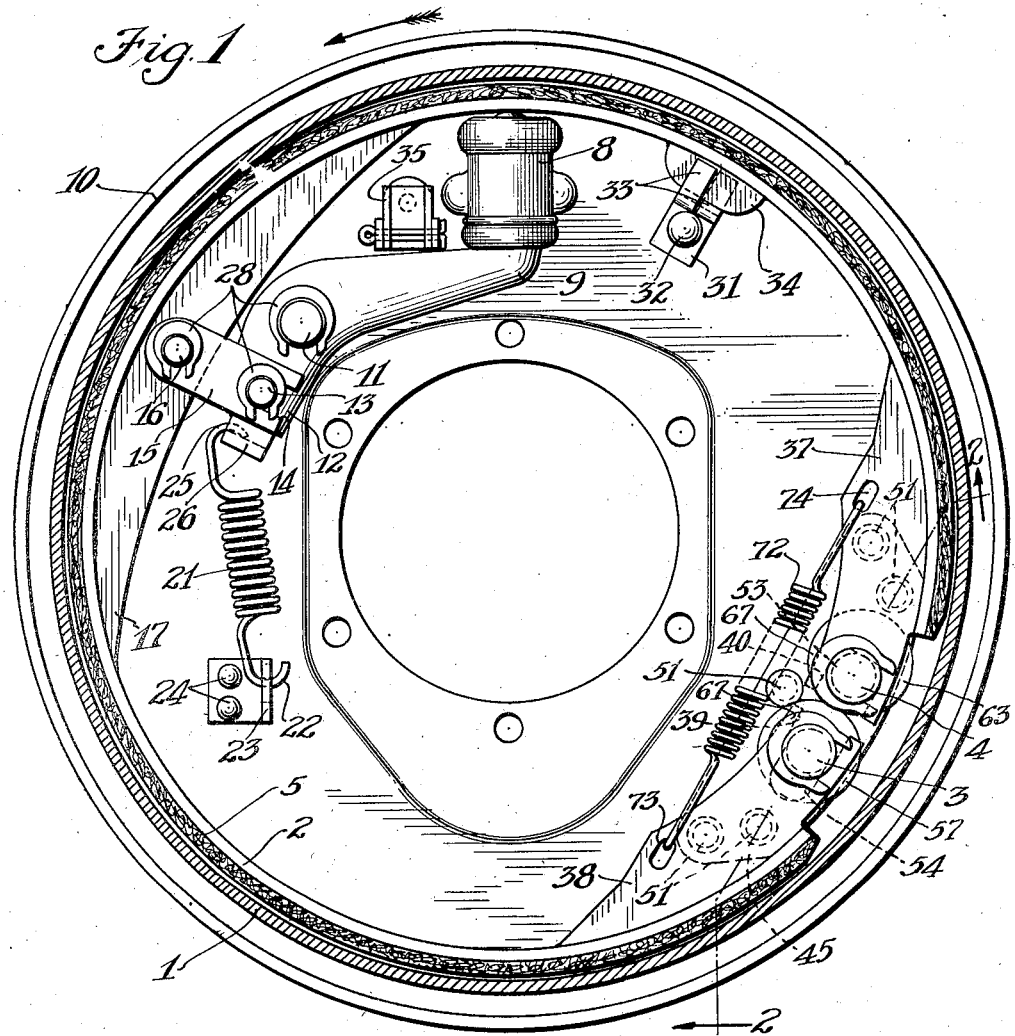
Figure 1 is a vertical section taken on the plane of the line 1—1 of Figure 2 passing through a brake drum and looking in the direction of the brake band and its supporting pan, the direction of rotation of the drum in the forward movement of the vehicle being indicated by the arrow.
Figure 2:
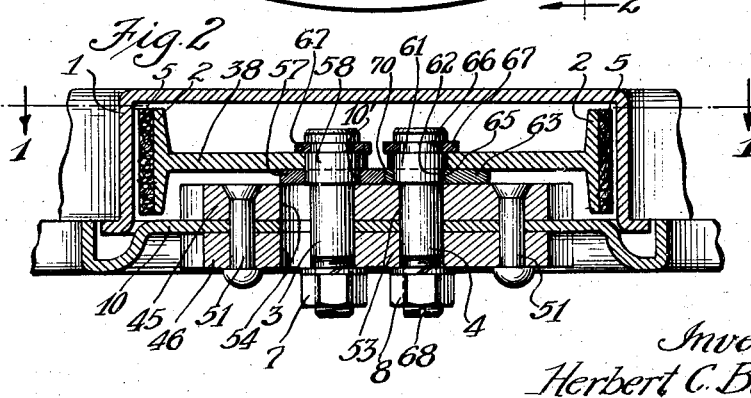
Figure 2 is a section taken on line 2—2 of Figure 1.

This invention is particularly useful in conjunction with brakes of the type illustrated in Figures 1 and 2, but is adaptable to many other types of brakes as will readily appear.

In Fig. 1 a brake band 2 extends adjacent the inner periphery of a brake drum 1 for cooperation therewith and has its ends held in place by pins or bolts 3 and 4. The brake band periphery is provided with a brake lining 5 of usual construction. During operation of the brake the pins 3 and 4 are fixed in position by means of nuts 7 and 8 and suitable means may be employed for forcibly pressing the side of the brake band opposite the pivots into engagement with the drum.

For purposes of illustration we have shown a mechanism consisting of a hydraulic cylinder 8 and an arm 9 adapted to be actuated by pressure from within the cylinder. The arm 9 is pivoted to the pan 10 by means of a bolt 11. A downwardly extending portion 12 of arm 9 has a bolt 13 therethrough which is adapted to engage the bottom of a slot 14 on a thrust arm 15 which in turn is secured by a bolt 16 to a wide reinforcing flange 17 on the brake band 2.

For the purpose of retracting the brake band from engagement with the drum upon release of hydraulic pressure in the cylinder 8 we have provided a coil spring 21 having one end 22 engaging a lug 23 fixed to the pan by suitable rivets or bolts 24. The upper end 25 of the spring 21 engages a lug 26 on the arm 15 in a manner to constantly urge rearwardly on the flange 17 of the band. Bolts 11, 13 and 16 are held in position by suitable means such as yieldable U-shaped spring collars 28. For the purpose of guiding the band through its range of movement we have provided a clip member 31 fixed by a rivet 32 and having spaced fingers 33 which are adapted to engage each side of a suitable rib 34 on the inner side of the band. In order to limit the retractile movement of the band a stop member 35 of any suitable form may be provided.

The adjacent ends of the band are provided with ribs 37 and 38 having U-shaped apertures 39 and 40 therein to snugly engage the pins 3 and 4 respectively. The pan 10 is provided with reinforcing plates 45 and 46 in a position beneath the ends of ribs 37 and 38 for rigidly holding the pins 3 and 4 in position when the nuts 7 and 8 are securely tightened onto the outside of plate 46. Plates 45 and 46 are held in position by rivets 51 passing through the same and through the plate 10. Axially aligned elongated openings 54 are provided through the pan and the reinforcing plates 45 and 46 for the accommodation of pin 3. Cylindrical openings 53 are provided to accommodate the pin 4, as best shown in Figure 2. The opening 54 is elongated sufficiently to permit adjustment of the pin 3 together with the end of the brake band on which the rib 38 is formed.

It has been determined from experiments that most of the wear on the brake lining is on the half of the lining between the thrust arm 15 and the flange 38. For this reason it is not necessary to adjust the position of pin 4 as sufficient of the slack or lost motion resulting from wear on the brake lining may be compensated for by adjustment of the pin 3 only.

For the purpose of effecting the desired adjustment of pin 3 a novel mechanism has been provided comprising a concentric disk 57 (Fig. 4) fitted on an enlarged portion 58 of bolt 3. This concentric disk is of such size that it lies flat on the inner face of the reinforcing plate 45 and is held in position by the slight pressure between the rib 38 and the plate 45 when the shoulder 10' of the pin 3 is held on plate 45 by the nut 7 as illustrated. The bolt or pin 4 is provided with a similar enlarged portion 61 which is flattened on one side at 62 and is adapted to receive a disk 63 (Fig. 5) having an eccentrically positioned opening 64 therein which is flattened at 65 on one side to prevent the rotation of the disk 63 relative to the enlarged portion 61 of the pin 4 when the pin 4 is rotated. The upper ends of pins 3 and 4 are provided with annular channels 66 in which are fitted suitable securing members such as spring collars 67 for preventing the ribs 37 and 38 of the band from passing off the inner ends of the pins. A slot 68 in the outer end of pin 4 is provided of such size to accommodate a screw driver or the like which may be inserted therein to rotate the pin together with its disk 63 for the purpose of forcing laterally on the disk 57 which abuts it at 70, thereby causing the pins to move laterally relative to each other, the pin 3 being guided in its movement by the edges of the elongated slot 54 through the reinforcing plates. If the pins are forced farther apart than desired they may be readily adjusted to a position closer to each other by again turning the pin 4 and permitting the coil spring 72 which engages in slots 73 and 74 in ribs 38 and 37 respectively to draw the pins toward each other. The spring 72 also aids in retracting the brake band from engagement with the drums.

The modification shown in Figure 3 comprises a drum 1 having a forward brake shoe 75 and a reverse brake shoe 76 disposed therein and adapted to have frictional engagement therewith. The brake shoes 75 and 76 are provided with flanges 88 which are provided with apertures 77 and 78 respectively which accommodate the pivot pins 3 and 4 respectively which are secured to the pan 10 in the manner shown in Figure 2. For the purpose of forcibly pressing the shoes into engagement with the drum is provided a hydraulic cylinder 79 having pistons therein which are connected by means of connecting rods 80 and 81 to the upper ends of the brake shoes in a manner such that when fluid pressure is admitted to the cylinder, the upper ends of the brake shoes are actuated into engagement with the drum. Suitable stop members such as pins 82 are provided for limiting the retractile movement of the brakes upon release of fluid pressure.

The brake shoes are retracted from engagement with the drum by means of coil springs 83 which engage lugs 84 and 85 on the shoes and on the pan respectively. For the purpose of guiding the shoes throughout their range of movement, pins 86 have been provided which pass through elongated slots 87 in the flanges 88 of the shoes. The shoes are prevented from passing off the ends of pins 86 by means of suitable washers 90 and cotter keys 91.

The detailed features of the adjusting mechanism illustrated in this modification are like those heretofore described and more clearly shown in Figure 2. The coil spring 72 in this modification also serves to aid in retracting the shoes from engagement with the drums as well as retaining the pins 3 and 4 seated in the bottom of the apertures 77 and 78. Since it is an experimental fact that the greater portion of wear on the brake lining is on the lining 92 secured to the forward shoe 75, it is not essential that the pin 4 be adjusted relative to the pan 10 to which it is secured and the elongated slot 54 in which the pin 3 is positioned provides space for adequate adjustment under all normal circumstances.

The adjusting mechanism herein described provides a relatively inexpensive means by which accurate adjustment may be accomplished and its use is not limited to brakes of the type illustrated in the drawings but may be equally well employed with many other forms of brakes as will be readily apparent to those skilled in the art and we do not intend to limit our invention except as set forth in the appended claims.

We claim as our invention:

1. In a brake mechanism the combination of a drum with a shoe, pivot means for anchoring the ends of the shoe, a disk on each of said pivots having their ends abutting each other, one of said disks being eccentrically positioned on its pivot and fixed for rotation therewith, whereby the rotation of the last said pivot causes lateral movement of the other said pivot.

2. In a brake mechanism the combination of a drum with a shoe, pivot means for anchoring the ends of the shoe, and abutting members on said pivots, one of which is eccentrically fixed on its pivot for rotation therewith, whereby upon rotation of one pivot the other pivot is moved laterally.

3. In a brake mechanism the combination of a brake drum with cooperating friction means, anchor pins for said friction means, one of said pins having a portion non-circular in cross section, a disk having an eccentrically positioned opening therein, non-circular in shape and fitted snugly on the non-circular portion of said pin, the periphery of said disk having abutment with the other said pin whereby upon rotation relative lateral movement of said pins is effected.

4. In a brake mechanism the combination of a brake drum with cooperating friction means, anchor pins for said friction means, one of said pins having a portion non-circular in cross section, a disk having an eccentrically positioned opening of such size and shape to snugly fit on the non-circular portion of said pin, a concentric disk on the other pin and engaging said eccentric disk, whereby upon rotation of said pin on which the eccentric disk is fixed, relative lateral adjustment of said pins is effected.

5. In a brake mechanism the combination of a brake drum with cooperating friction means, anchor pins for said friction means, one of said pins having a portion non-circular in cross section, a disk having an eccentrically positioned opening of such size and shape to snugly fit on the non-circular portion of said pin, a concentric disk on the other pin and engaging said eccentric disk, whereby upon rotation of said pin on which the eccentric disk is fixed, relative lateral adjustment of said pins is effected, and means urging said pins toward each other.

6. In a brake mechanism the combination of a brake drum with cooperating friction means, a fixed mounting member for said friction means, anchor pins for said friction means passing through openings in said mounting member, one of which openings is of such dimension to permit lateral movement of the pin therein, yielding means urging said pins toward each other, abutting disks on said pins, one of which is eccentrically mounted and fixed for rotation with its pin, whereby rotation effects relative lateral movement of said pins.

7. In a brake mechanism the combination of a brake drum with cooperating friction means, a fixed mounting member for said friction means, anchor pins for said friction means passing through openings in said mounting member, one of which openings is of such dimension to permit lateral movement of the pin therein, yielding means urging said pins toward each other, a concentric element in one of said pins and eccentric element fixed for rotation with the other pin and abutting said concentric element, the pin on which said ecentric element is fixed being provided with a slot adapted to receive a screw driver and rotate the same and said eccentric element whereby the concentric element with its pin is adjusted laterally, and means on said pin for securing said pin in adjusted positions.

In witness whereof, we hereunto subscribe our names this 11 day of February, 1930.

HERBERT C. BOWEN.
JOSEPH R. HEIDLOFF.